F. W. COTTON.
CONSTRUCTION OF MOTOR CYCLES.
APPLICATION FILED JULY 6, 1915.

1,169,381.   Patented Jan. 25, 1916.

INVENTOR
Frank W. Cotton.
PER
Spear, Middleton, Donaldson & Spear
ATTORNEY

UNITED STATES PATENT OFFICE.

FRANK WILLOUGHBY COTTON, OF LEDBURY, ENGLAND.

CONSTRUCTION OF MOTOR-CYCLES.

1,169,381.

Specification of Letters Patent.

Patented Jan. 25, 1916.

Application filed July 6, 1915. Serial No. 38,278.

*To all whom it may concern:*

Be it known that I, FRANK WILLOUGHBY COTTON, a subject of the King of Great Britain, and resident of Ledbury, in the county of Hereford, England, have invented certain new and useful Improvements in and Relating to the Construction of Motor-Cycles, of which the following is a specification.

This invention relates to the construction of motor cycle frames and it has for its object to provide an improved construction of the type which comprises duplicated stays.

By this invention a frame is formed of straight tubes, which is very strong in every direction, as well as being cheap to manufacture. A frame constructed in this way provides a very low seat and enables the position of the engine with regard to the length of the machine to be very considerably varied.

Figure 1:
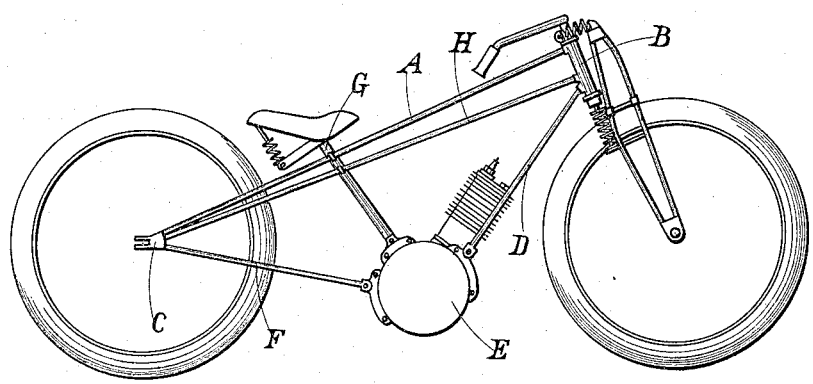
Figure 2:
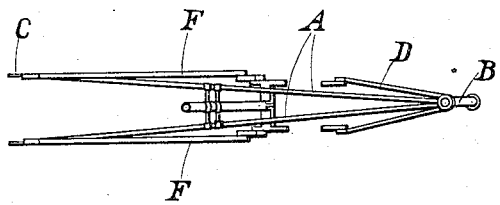
Figure 3:
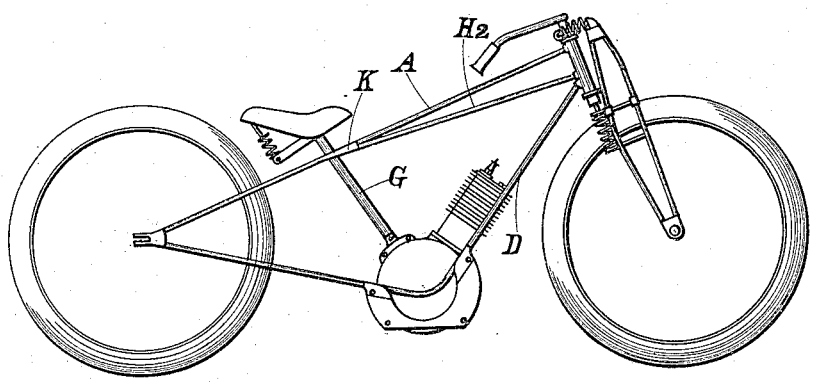

In the accompanying drawings, Figure 1 is a side elevation showing one method of carrying out this invention. Fig. 2 is a plan of the same, and Fig. 3 is a side elevation of a modified construction.

Like letters indicate like parts throughout the drawings.

The two top stays are shown at A and it will be noticed that these diverge from the top of the steering head B being attached to the rear fork end lugs C. The lower pair of tubes D extend from the bottom of the steering head and are attached to the engine crank chamber E, and from the engine there project backward the usual chain stays F. The seat pillar tube G is attached to the tubes A and to the crank chamber, and also to a pair of central tubes H which extend from the bottom of the steering head to the rear fork end in the construction shown in Figs. 1 and 2. These tubes lie beneath the tubes A and therefore are not visible in Fig. 2. Alternatively, the central tubes $H^2$ may be attached to a lug K at the point where the seat pillar G is attached to the top tubes A, as is shown in Fig. 3. With this type of frame the tubes D may be more or less vertical than is shown in the drawing so that the engine may be brought forward or moved farther back. It will be clear that the seat is low and as far back as is required, and each pair of tubes is well spaced, giving lateral stiffness to the frame, and as straight tubes alone are used a very strong construction results, which is cheap to manufacture.

What I claim as my invention, and desire to secure by Letters Patent of the United States, is:—

1. In a motor cycle frame, a steering head, a pair of top stays extending backward from the top of said steering head, a pair of bottom stays extending downward from the bottom of the steering head, chain stays, rear fork end lugs connecting said chain stays to said top stays, a seat pillar tube attached to said top stays, and central stays extending rearward from the bottom of said steering head, substantially as set forth.

2. In a motor cycle frame, a steering head, a pair of top stays extending backward from the top of said steering head, a pair of bottom stays extending downward from the bottom of the steering head, chain stays, rear fork end lugs connecting said chain stays to said top stays, a seat pillar tube attached to said top stays, and central stays extending from the bottom of said steering head to said rear fork end lugs substantially as set forth.

In testimony whereof I have signed my name to this specification in the presence of two subscribing witnesses.

FRANK WILLOUGHBY COTTON.

Witnesses:
FRED ROGERS,
GEORGE W. ANDERSON.

Copies of this patent may be obtained for five cents each, by addressing the "Commissioner of Patents, Washington, D. C."